No. 785,488. Patented March 21, 1905.

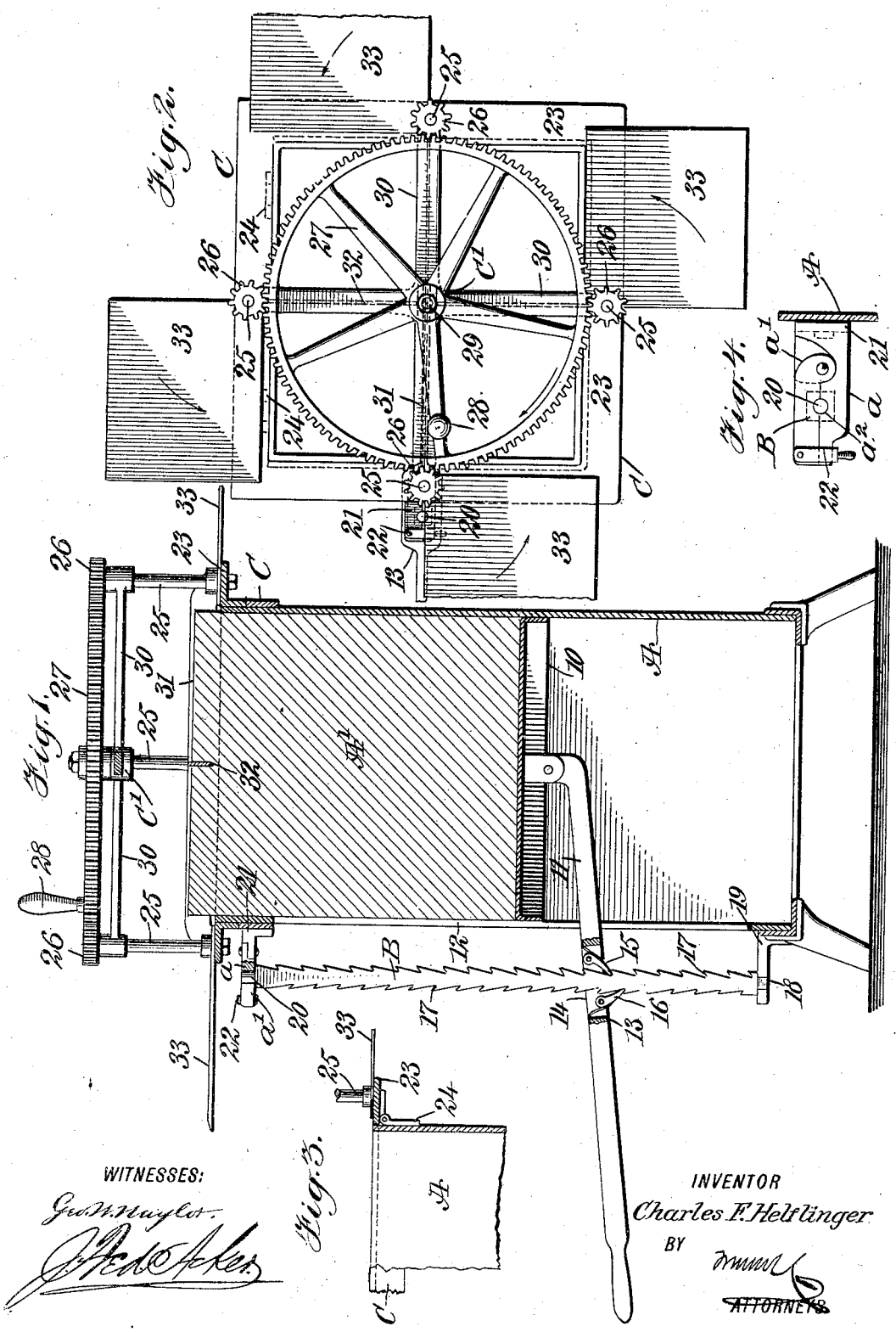

UNITED STATES PATENT OFFICE.

CHARLES F. HELFLINGER, OF ELIZABETH, NEW JERSEY.

MACHINE FOR CUTTING BUTTER.

SPECIFICATION forming part of Letters Patent No. 785,488, dated March 21, 1905.

Application filed November 1, 1904. Serial No. 230,910.

*To all whom it may concern:*

Be it known that I, CHARLES F. HELFLINGER, a citizen of the United States, and a resident of Elizabeth, in the county of Union and State of New Jersey, have invented a new and Improved Machine for Cutting Butter, of which the following is a full, clear, and exact description.

The purpose of the invention is to provide a simple, practical, and compact machine so constructed that butter in bulk may be placed in the machine and fed up to vertically-disposed knives which separate the upper portion of the body of butter into divisions and to provide horizontally-operating knives which when the upper portion of the body of butter is vertically divided act to horizontally sever the butter in bulk, thus dividing the upper portion of the body or bulk of butter into a given number of pats.

Another purpose of the invention is to provide means for moving the horizontal knives inward and outward, so that after they are moved inward to complete the cutting operation they can be moved outward, and at such time will carry the severed portions or pats of butter with them.

Another purpose of the invention is to so construct the machine that at each movement of a lever a follower will be carried up a predetermined distance, so as to render of uniform thickness the pats cut from the body or bulk of butter, and, furthermore, to so construct the machine that it will comprise but few parts, and so that all the parts may be readily cleaned.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through the machine. Fig. 2 is a plan view of the machine. Fig. 3 is a detail vertical section of a part of the upper portion of the machine, illustrating the manner in which the supports for the knives are connected with the body of the machine; and Fig. 4 is a horizontal section through a portion of one side of the body of the machine and a plan view of the bracket employed to hold in place the upper end of the gage rod or member employed.

A represents a receptacle which is open at the top, which receptacle is preferably rectangular in cross-section, as is shown, although it may be given any desired shape. A follower 10 is mounted for movement in the receptacle A, and this follower is adapted to support and to feed upwardly a block of butter A'. The receptacle A is operated through the medium of a lever 11, which is pivotally connected with the bottom of the follower and extends out through a vertical slot 12, produced in a side of the receptacle. This lever 11 outside of the receptacle is provided with an enlargement 13, having a slot 14 made therein, as is shown in Fig. 1, and two downwardly-pointed spring-controlled pawls 15 and 16 are pivoted in the opening or slot 14 of the lever, one pawl being higher than the other, and these pawls engage with a rack gage-bar B, the teeth 17 of which bar are at opposite sides and are in staggered arrangement, as is also shown in Fig. 1. The lower trunnion 18 of the rack gage-bar B is preferably polygonal and is made to enter a correspondingly-shaped opening in a bracket 19, secured to the outside of the receptacle A at the bottom of the slot 12, and a circular trunnion 20 is formed at the upper end of the rack gage-bar, which circular trunnion is held in a two-part bracket 21, secured to the exterior of the receptacle A at the upper end of the slot 12 in said receptacle. This two-part bracket 21 is constructed, preferably, as is shown in Fig. 4, comprising the member $a$, which is fixed to the receptacle, and a member $a'$, pivoted to the fixed member, the two members at their opposing side edges having segmental recesses $a^2$ made therein, into which recesses the upper trunnion 20 of the gage rack-bar B is entered, and the two members $a$ and $a'$ are held locked together by means of a clamp 22, usually pivoted to one member of the bracket in a manner to have locking engagement with the other member. When the lever 11 is moved up the distance of one notch, a certain amount of butter at the top of the block A' is carried above the mouth of the receptacle, and this outwardly-extending portion of the block A' is vertically divided and horizontally severed in a manner to be hereinafter described.

The projecting portion of the block of butter may be of any desired thickness, and the rack gage-bar B can have its teeth so located that only a certain amount of movement will be given to the follower 10 at each movement of the lever 11. Therefore the gage rack-bar B is made removable from the receptacle, permitting any style of rack-bar required to be placed in position relative to the receptacle. Each time the lever is operated it is moved up one notch.

A skeleton frame C is exteriorly located at the mouth of the receptacle A, and this frame C is provided with a horizontal outwardly-extending flange member 23. This frame is also preferably connected with one side of the receptacle A by means of hinges 24, so that the frame may be thrown back when it is desired to place a block of butter in the receptacle.

At the central portion of each side of the receptacle A a vertical shaft 25 is journaled in the flange member 23 of the skeleton frame C. Each shaft 25 has a pinion 26 secured to its upper end, and these pinions are all simultaneously turned through the medium of a horizontal gear 27, meshing therewith and provided with a handle 28, whereby the gear is readily turned. The gear 27 turns upon a shaft 29, and this shaft 29 extends from the central portion of a spider-frame C', the arms 30 of which spider-frame have sleeves at their outer ends loosely passed over the shafts 25 and made to rest on shoulders formed on the shafts by reducing them in diameter at their upper portions.

Two vertical knives 31 and 32 are secured to the flange member 23 of the skeleton frame C. These knives cross each other at the center of the receptacle A, as is shown by dotted lines in Fig. 2, and their lower edges are cutting edges and the ends of the knives are located opposite the shafts 25, carrying the pinions 26. Thus it will be observed the vertical knives 31 and 32 divide the upper portion of the receptacle A into four divisions.

A horizontal knife 33 is secured to each shaft 25, and these knives 33 correspond in shape to the shape of the divisions at the mouth of the receptacle. In the drawings these horizontal knives 33 are rectangular in form and are secured at one of their corners to the shafts 25. These knives 33 when the gear-wheel 27 is turned in one direction will move in direction of the arrows shown in Fig. 2 and will cover the division-spaces formed by the vertical knives, and in so doing the horizontal knives will pass close to the cutting edges of the vertical knives. Therefore when a block of butter A' is fed upward to the required extent in the manner stated the vertical knives will divide the projecting end of the block into four divisions, and when the horizontal knives are moved toward the vertical knives said horizontal knives will horizontally cut the projecting end portion of the block. Thus in conjunction with the vertical knives the projecting end of the block A' will be divided into a series of rectangular pats, and when the horizontal knives 33 are carried outward to the position shown in Fig. 2, which is done by reversing the movement of the gear 27, they carry the pats of butter with them, and while these pats are being removed from the knives 33 the follower 10 is again moved upward and the projecting end portion of the block of butter is again vertically divided by the vertically-disposed knives 31 and 32.

A machine constructed as above set forth is very simple, is light, and is very strong, and by its means a block of butter can be cleanly and quickly divided into pats of the required shape.

Having thus described my invention, I claim as new and desire to secure by Letters Patent—

1. A machine for cutting butter, comprising a receptacle, crossed knives vertically disposed with reference thereto, a vertically-adjustable plunger therein, vertically-disposed shafts beyond the sides of the receptacle at the upper part thereof, a horizontal knife carried by each shaft, and means for operating said shafts to swing each horizontal knife back and forth across one of the spaces formed by said crossed knives.

2. A machine for cutting butter, comprising a receptacle, crossed knives vertically disposed with reference thereto, a vertically-adjustable plunger therein, vertically-disposed shafts beyond the sides of the receptacle at the upper part thereof, and a hand-operated gearing for actuating said shafts to swing each horizontal knife back and forth across one of the spaces formed by said crossed knives.

3. A machine for cutting butter, comprising a receptacle, crossed knives vertically disposed with reference thereto, a vertically-adjustable plunger therein, vertically-disposed shafts beyond the sides of the receptacle at the upper part thereof, a pinion and a horizontal knife carried by each shaft, and a single gear-wheel engaging with said pinions for operating said shafts to swing each horizontal knife back and forth across one of the spaces formed by said crossed knives.

4. In a machine for cutting butter, a receptacle, stationary knives crossing one another at the mouth of the receptacle, shafts mounted to turn at the mouth of said receptacle, one at each end of each stationary knife, means for rotating the shafts, horizontal knives secured to the shafts to move therewith, corresponding in shape to the shape of the divisions formed by the stationary knives and arranged for movement toward and from the cutting edges of the stationary knives, a follower within the receptacle, and operating and regulating means for the follower.

5. A receptacle, a follower therein, a lever connected with the follower, being passed out through a slot in the receptacle, the said lever having an opening therein, brackets located at the exterior of the receptacle at the top and bottom of the slot in which the lever has movement, one of said brackets consisting of a fixed and a movable section, and a locking device for the sections, a gage-bar removably supported at its ends in the said brackets, the said gage-bar having ratchet-teeth, and spring-controlled pawls mounted in the opening in the said lever, for engagement with the ratchet-teeth on the gage-bar.

In testimony whereof I have signed my name to this specification in the presence of two subscribing witnesses.

CHARLES F. HELFLINGER.

Witnesses:
J. FRED. ACKER,
JNO. M. RITTER.